United States Patent
Ninos et al.

(10) Patent No.: US 12,436,272 B2
(45) Date of Patent: Oct. 7, 2025

(54) METHOD AND DEVICE FOR PROVIDING TRACKING DATA FOR RECOGNIZING THE MOVEMENT OF PERSONS AND HANDS FOR CONTROLLING AT LEAST ONE FUNCTION OF A TECHNICAL SYSTEM, AND SENSOR SYSTEM

(71) Applicant: Robert Bosch GmbH, Stuttgart (DE)

(72) Inventors: Alexandros Ninos, Tuebingen (DE); Juergen Hasch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 428 days.

(21) Appl. No.: 17/938,235

(22) Filed: Oct. 5, 2022

(65) Prior Publication Data
US 2023/0118390 A1 Apr. 20, 2023

(30) Foreign Application Priority Data
Oct. 18, 2021 (DE) ................. 10 2021 211 743.0

(51) Int. Cl.
*G01S 13/931* (2020.01)
*G01S 13/72* (2006.01)

(52) U.S. Cl.
CPC .......... *G01S 13/931* (2013.01); *G01S 13/72* (2013.01)

(58) Field of Classification Search
CPC ........ G01S 13/726; G01S 13/66; G01S 7/417; G01S 7/415; G01S 7/354; G01S 7/4802
USPC ................................. 342/114, 59
See application file for complete search history.

(56) References Cited

U.S. PATENT DOCUMENTS

| | | | | |
|---|---|---|---|---|
| 8,175,374 | B2 * | 5/2012 | Pinault | G06V 20/64 |
| | | | | 382/154 |
| 9,990,540 | B2 * | 6/2018 | Ariizumi | G06V 20/64 |
| 11,126,885 | B2 * | 9/2021 | Santra | G06F 18/217 |

(Continued)

FOREIGN PATENT DOCUMENTS

| | | |
|---|---|---|
| CN | 113646736 A | 11/2021 |
| DE | 102013211335 B4 | 9/2019 |
| DE | 102019200141 A1 | 7/2020 |

OTHER PUBLICATIONS

A Novel Approach for Model-Based Pedestrian Tracking Using Automotive Radar by Patrick Held at IEEE listed on IDS, date of first publication Mar. 24, 2021. (Year: 2021).*

(Continued)

*Primary Examiner* — Michael W Justice
(74) *Attorney, Agent, or Firm* — NORTON ROSE FULBRIGHT US LLP

(57) ABSTRACT

A method for providing personal tracking data for controlling at least one function of a technical system. The method includes reading in, executing, and generating. During the reading in, sensor data from two spaced-apart radar sensors with partially overlapping fields of view are read in, the sensor data representing a point cloud made up of point targets that are detected with the aid of the radar sensors. During the execution, an estimation algorithm is executed, using the sensor data, in order to generate at least one corrected position profile track, the estimation algorithm applying a density-based cluster analysis algorithm. During the generating, the tracking data are generated using the at least one corrected position profile track.

13 Claims, 3 Drawing Sheets

(56) References Cited

U.S. PATENT DOCUMENTS

| | | | | |
|---|---|---|---|---|
| 2010/0208035 | A1* | 8/2010 | Pinault | G06V 40/10 |
| | | | | 348/46 |
| 2012/0001787 | A1 | 1/2012 | van Dorp | |
| 2016/0342830 | A1* | 11/2016 | Ariizumi | G06V 20/64 |
| 2020/0250413 | A1* | 8/2020 | Lu | G06V 30/228 |
| 2020/0302210 | A1* | 9/2020 | Santra | G06V 10/764 |

OTHER PUBLICATIONS

Held et al., "A Novel Approach for Model-Based Pedestrian Tracking Using Automotive Radar," IEEE Transactions on Intelligent Transportation Systems, 2021, pp. 1-14.

* cited by examiner

METHOD AND DEVICE FOR PROVIDING TRACKING DATA FOR RECOGNIZING THE MOVEMENT OF PERSONS AND HANDS FOR CONTROLLING AT LEAST ONE FUNCTION OF A TECHNICAL SYSTEM, AND SENSOR SYSTEM

CROSS REFERENCE

The present application claims the benefit under 35 U.S.C. § 119 of German Patent Application No. DE 10 2021 211 743.0 filed on Oct. 18, 2021, which is expressly incorporated herein by reference in its entirety.

FIELD

The present invention is directed to a device and a method for providing tracking data for recognizing the movement of persons and hands for controlling at least one function of a technical system. Moreover, the present invention relates to a computer program.

BACKGROUND INFORMATION

Traditionally, a radar sensor including, for example, four receiving antennas and three transmitting antennas and a tracking algorithm may be utilized for personal tracking in indoor and outdoor areas.

SUMMARY

The present invention provides a method, a device that uses this method, a sensor system, and a corresponding computer program. Advantageous refinements and enhancements of the device disclosed herein are possible by the use of the measures disclosed herein.

According to specific embodiments of the present invention, a method and a device for personal tracking and optionally, additionally for hand tracking, are provided, in particular using two radar sensors, or in other words a millimeter wave radar system. For example, positions of multiple persons may be simultaneously tracked using an enhanced instruction pipeline. This may optionally take place in particular combined with an enhanced gesture recognition pipeline which is robust with respect to recognition, even simultaneous recognition, of gestures of multiple users in the field of view (FoV) of the sensors. Thus, at least one person and optionally also his/her moving arms when making a gesture may be correctly assigned to clusters or groups and tracked. A hand of a user may optionally also be tracked in two dimensions, in particular after the user has activated the function, for example via a button, by voice, or even by a gesture. To achieve greater accuracy, an enhanced hardware setup that allows two radar nodes may be used for this purpose.

According to specific embodiments of the present invention, in particular for the position tracking of at least one person or at least one user, robust behavior may be advantageously achieved in the case that the user is making a gesture and is close to some other object. The tracking algorithm used for the position tracking may correctly assign detected points to the user, and as a result, correct results may be delivered to a gesture recognition algorithm, for example. In addition, robust behavior may also be achieved in the following example cases: If two users, for example, are close together, by use of the density-based algorithm the situation may be prevented that the users are regarded as one cluster, and this cluster is then assigned to the nearest track. The other track that was assigned to the other person in preceding frames may be updated, even if this is repeated for multiple frames, and the other track may be maintained by the track management system. If the two users are separated, the two clusters may once again be separated and their identification retained. A history of the original track may thus be maintained. This also functions in particular even in more complex cases with three or four separate objects. Thus, in particular the signal processing method provided here for tracking persons may be made robust in two areas, for example: If the user makes a gesture, the point targets or punctiform targets or target objects belonging to his/her arms may be correctly assigned to the track of the user. If multiple users are close to one another, their tracks may be kept separate.

According to specific embodiments of the present invention, radar sensor systems may be advantageously used in particular for hand tracking.

According to the present invention, a method for providing personal tracking data for controlling at least one function of a technical system is provided, the tracking data representing a profile of a position of at least one person. According to an example embodiment of the present invention, the method includes the following steps:

reading in sensor data from an interface to a preprocessing device for preprocessing raw data of two spaced-apart radar sensors having partially overlapping fields of view, the sensor data representing a point cloud that is generated by the preprocessing device and made up of point targets that are detected in the detection surroundings with the aid of the radar sensors;

executing an estimation algorithm, using the sensor data, in order to generate at least one corrected position profile track of the position of the at least one person;

separating the at least one corrected position profile track into a body track and a hand track, using a cluster analysis algorithm;

applying the estimation algorithm to the hand track in order to generate a corrected hand track; and generating the tracking data, using the at least one corrected position profile track and the corrected hand track.

The function of the technical system may be gesture recognition, vital sign detection, object recognition, hand tracking, and/or the like. The radar sensors may be implemented using millimeter wave radar. The detection surroundings may be defined by the fields of view of both radar sensors. Detected attributes may now be assigned to the detected point targets. The attributes may include range, radial velocity, azimuthal incidence angle, elevation incidence angle, and additionally or alternatively, magnitude. The cluster property may represent a center of gravity of the particular cluster, a piece of identification information concerning the particular cluster, and/or the like. The method may also include a step of outputting the tracking data at an interface to the technical system. A combination of the tracking of persons, to what location they are moving, and of hands may be provided which may be assigned to various persons with the aid of the tracking, and which subsequently allows an evaluation of a hand gesture of a person via the movement profile, for example. By use of the estimation algorithm, at least one track that is assigned to an object and that may map a temporal profile of a movement of the object may be determined from the point cloud. A position profile track may be understood to mean a temporal profile of a position of the at least one person, based on a predefined geometric and/or geographical reference system. The body track may be understood as that portion of the position profile track that relates to a body section of the at least one person, excluding at least one upper extremity of the body. The hand track may be understood as that portion of the position profile track that relates to at least one upper extremity of the body of the at least one person.

According to an example embodiment of the present invention, the estimation algorithm that is executed in the step of executing may be designed i) to predict, for a present detection point in time, at least one position profile track to be corrected, using a predefined kinematic model, point targets from the sensor data that are detected at the present detection point in time, and at least one preliminary position profile track, ii) to determine, from the sensor data and the at least one position profile track to be corrected, distance values between point targets that are detected at the present detection point in time, iii) to assign point targets that meet a distance criterion to the at least one position profile track to be corrected, iv) to apply a density-based cluster analysis algorithm to point targets that are assigned to the at least one position profile track to be corrected, in order to determine at least one cluster property, and v) to correct the at least one position profile track to be corrected, using the at least one cluster property, in order to generate the at least one corrected position profile track.

According to one specific embodiment of the present invention, the method may include a step of ascertaining the at least one preliminary position profile track of the position of the at least one person, using point targets from the sensor data that are detected at at least two past detection points in time. Such a specific embodiment offers the advantage that without a previously known position profile track, a data basis for the estimation algorithm may be provided. Alternatively, the preliminary position profile track may also be read in by a memory device from a plurality of predefined position profile tracks.

In addition, according to an example embodiment of the present invention, the step of executing may be repeated at least once. The estimation algorithm may be an iterative estimation algorithm, in particular a Kalman filter. Additionally or alternatively, for a repeated carrying out of the step of executing, the at least one corrected position profile track from an immediately preceding carrying out of the step of executing may be used as the at least one preliminary position profile track. Such a specific embodiment offers the advantage that the accuracy of the corrected position profile track may be further improved with each repeated carrying out.

In particular, the distance criterion used in the step of executing may allow a maximum distance value of at least 1 meter. Such a specific embodiment offers an advantage that, for example, during an arm gesture of the persons whose position is tracked, all point targets of the arm may be reliably assigned.

Furthermore, according to an example embodiment of the present invention, in the step of executing, point targets that belong to a largest cluster of clusters that are generated with the aid of the density-based cluster algorithm may be assigned to the at least one position profile track to be corrected. Such a specific embodiment offers the advantage that noisy point targets that meet criteria of a constant false alarm rate may be discarded, since they will not form a dense region. In addition, point targets of other persons who are initially assigned to the track to be corrected may also be discarded by the density-based cluster algorithm, since they will form a smaller cluster.

In addition, according to an example embodiment of the present invention, in the step of separating, two new clusters may be generated, starting from an original cluster that is assigned to the corrected position profile track. The new cluster situated closer to the radar sensors may be assigned to the hand track, and the new cluster situated farther from the radar sensors may be assigned to the body track. Such a specific embodiment offers the advantage that for the position tracking of at least one hand of a person, the hand track may be tracked separately from the body track, and reliable and accurate hand tracking may thus be made possible.

According to an example embodiment of the present invention, in the step of applying, a velocity vector of point targets assigned to the hand track may be estimated, using radial velocities and azimuth angles of the point targets that are detected with the aid of the radar sensors. Such a specific embodiment offers the advantage that hand tracking for gesture recognition, for example, may take place quickly and accurately.

The velocity vector may be used as a parameter of the estimation algorithm when the point targets assigned to the hand track are situated in an overlapping area of the fields of view of the radar sensors. Otherwise, the estimation algorithm or some other estimation algorithm without a velocity vector may be used as a parameter. Such a specific embodiment offers the advantage that reliable and exact hand tracking is made possible, depending on the position of a hand relative to the fields of view of the radar sensors.

According to an example embodiment of the present invention, the method may optionally also include a step of detecting point targets in the detection surroundings of the two spaced-apart radar sensors with partially overlapping fields of view. Such a specific embodiment offers the advantage that an accurate and reliable data basis for the tracking method may be provided.

According to an example embodiment of the present invention, the method may optionally also include a step of preprocessing raw data of the two spaced-apart radar sensors with partially overlapping fields of view in order to generate a point cloud from point targets that are detected in the detection surroundings with the aid of the radar sensors. Preprocessing may also be understood to mean the carrying out of baseband processing. Such a specific embodiment offers the advantage that the point cloud made up of detected point targets and optionally also attributes assigned to the point targets may be easily and reliably generated from the raw data.

This method may be implemented, for example, in software or hardware or in a mixed form made up of software and hardware, for example in a device or a control unit.

Moreover, the approach presented here provides a device that is designed to carry out, control, or implement the steps of one variant of a method provided here in appropriate units. By use of this embodiment variant of the approach in the form of a device, the object underlying the present invention may also be achieved quickly and efficiently.

For this purpose, according to an example embodiment of the present invention, the device may include at least one processing unit for processing signals or data, at least one memory unit for storing signals or data, and at least one interface to a sensor or an actuator for reading in sensor signals from the sensor or for outputting data signals or control signals to the actuator, and/or at least one communication interface for reading in or outputting data that are embedded in a communication protocol. The processing unit may be, for example, a signal processor, a microcontroller, or the like, it being possible for the memory unit to be a flash memory, an EEPROM, or a magnetic memory unit. The communication interface may be designed for reading in or outputting data wirelessly and/or in a hard-wired manner, it being possible for a communication interface, which may read in or output the hard-wired data, to read in these data electrically or optically, for example, from a corresponding data transmission line, or to output these data into a corresponding data transmission line.

In the present context, a device may be understood to mean an electrical device that processes sensor signals and outputs control and/or data signals as a function thereof. The device may include an interface that may have a hardware and/or software design. In a hardware design, the interfaces may be part of a so-called system ASIC, for example, which contains various functions of the device. However, it is also possible for the interfaces to be dedicated, integrated circuits, or to be at least partially made up of discrete components. In a software design, the interfaces may be software modules that are present, for example, on a microcontroller in addition to other software modules.

In addition, according to an example embodiment of the present invention, a sensor system is provided that includes the following features:
 a specific embodiment of the device provided herein;
 the two spaced-apart radar sensors with partially overlapping fields of view; and
 the preprocessing device for preprocessing raw data of the radar sensors, the preprocessing device being connected to the radar sensors and to the device in a data-transmissible manner.

The sensor system may also be referred to as a radar sensor system. The device may be advantageously used or employed in conjunction with the sensor system to carry out position tracking of at least one person, and additionally or alternatively, of at least one of the person's hands.

Also advantageous is a computer program product or computer program including program code that may be stored on a machine-readable medium or memory medium such as a semiconductor memory, a hard disk, or an optical memory, and used for carrying out, implementing, and/or controlling the steps of the method according to one of the specific embodiments described above, in particular when the program product or program is executed on a computer or a device.

Exemplary embodiments of the present invention are illustrated in the figures and explained in greater detail below.

DETAILED DESCRIPTION OF EXAMPLE EMBODIMENTS

Figure 1:
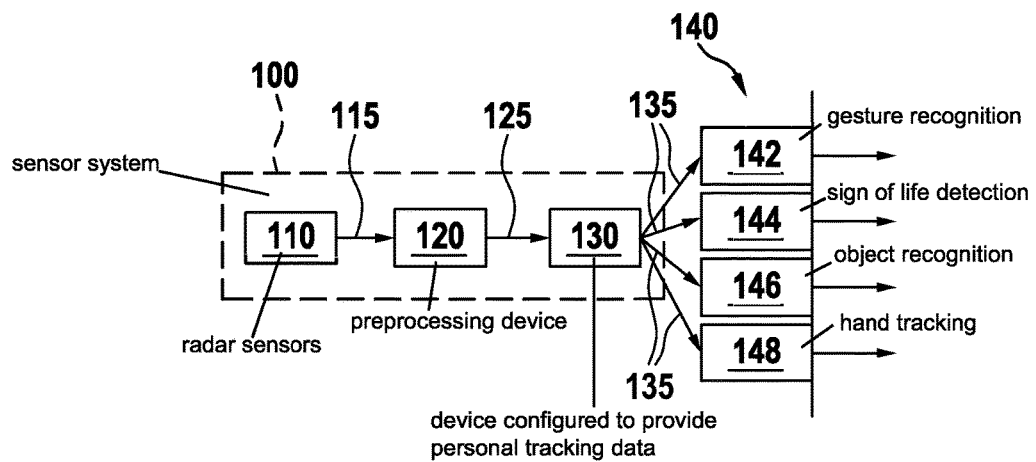
FIG. 1 shows a schematic illustration of a sensor system according to one exemplary embodiment of the present invention.

In the following description of advantageous exemplary embodiments of the present invention, identical or similar reference numerals are used for the elements having a similar action which are illustrated in the various figures, and a repeated description of these elements is dispensed with.

FIG. 1 shows a schematic illustration of a sensor system 100 according to one exemplary embodiment of the present invention. Sensor system 100 includes two spaced-apart radar sensors 110 with partially overlapping fields of view, a preprocessing device 120 for preprocessing raw data 115 of radar sensors 110 to form sensor data 125, and a device 130 for providing personal tracking data 135 for controlling at least one function 142, 144, 146, 148 of a technical system 140. Preprocessing device 120 is connected to radar sensors 110 and to device 130 in a data-transmissible manner.

For example, an analog-to-digital conversion of raw data 115 between radar sensors 110 and preprocessing device 120 also takes place. Preprocessing device 120 is in particular designed to carry out baseband processing. Sensor data 125 represent a point cloud that is generated by preprocessing device 120 and made up of point targets that are detected in the detection surroundings with the aid of radar sensors 110. In particular, device 130 is discussed in greater detail with reference to the figures described below.

According to the exemplary embodiment illustrated here, technical system 140 includes four functions 142, 144, 146, 148, strictly by way of example. A first function 142 is gesture recognition, for example, which is intended to deliver a recognized gesture. A second function 144 is sign of life detection, for example, which is intended to recognize a living object, a breathing rate, or the like. A third function 146 is object recognition, for example, which may possibly be designed to be overruled and which is intended to recognize at least one object. A fourth function 148 is hand tracking, for example, which is intended to recognize a hand position.

In other words, FIG. 1 shows an overview of sensor system 100 or of the radar system together with the associated signal processing and possible applications. The focus here is on personal tracking, hand tracking, and gesture recognition, for example.

Figure 2:
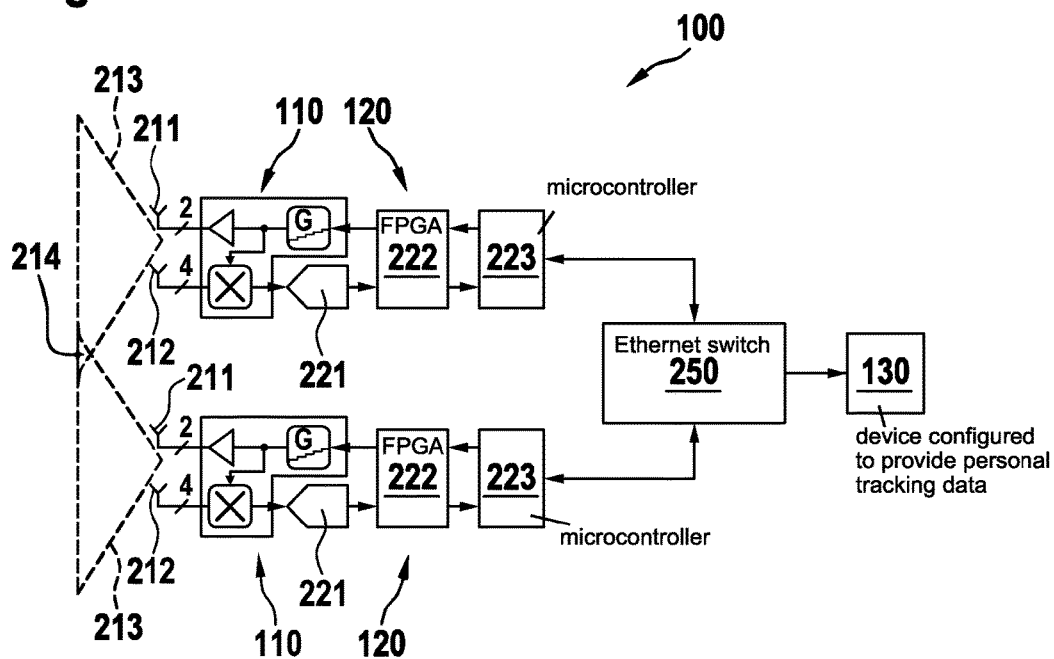
FIG. 2 shows a schematic illustration of a sensor system according to one exemplary embodiment of the present invention.

FIG. 2 shows a schematic illustration of a sensor system 100 according to one exemplary embodiment. Sensor system 100 corresponds to or resembles the sensor system from FIG. 1. Radar sensors 110, preprocessing device 120, a Precision Time Protocol (PTP) Ethernet switch 250, and device 130 of sensor system 100 are shown.

Each of the two radar sensors 110 includes a transmitting antenna 211, a receiving antenna 212, and an electrical circuit system, as is available in the field of radar sensors, for example including an output amplifier, a multiplexer, and the like. Each of radar sensors 110 has a field of view 213. In addition, FIG. 2 schematically illustrates an overlapping area 214 of fields of view 113 of radar sensors 110.

According to the exemplary embodiment illustrated here, a dedicated preprocessing device 120 is associated with each of radar sensors 110. Each of preprocessing devices 120 includes an analog-to-digital converter 221, a field-programmable gate array (FPGA) 222, and a microcontroller 223.

The two systems, each made up of a radar sensor 110 and a preprocessing device 120, are connected via and to PTP Ethernet switch 250 in a signal- or data-transmissible manner. PTP Ethernet switch 250 handles a data output and a time synchronization between radar sensors 110. PTP Ethernet switch 250 is also connected to device 130 in a data-transmissible manner.

In other words, FIG. 2 shows a schematic illustration of an example configuration of a loosely coupled sensor network for use in particular for hand tracking. Two identical radar nodes or radar sensors 110 are used. The measurements of the two radar sensors 110 are triggered with a few microseconds' difference, for example, so that no interference results between them. The two radar sensors 110 are spaced apart at a distance of a few centimeters (50 cm, for example) along the x axis.

Figure 3:
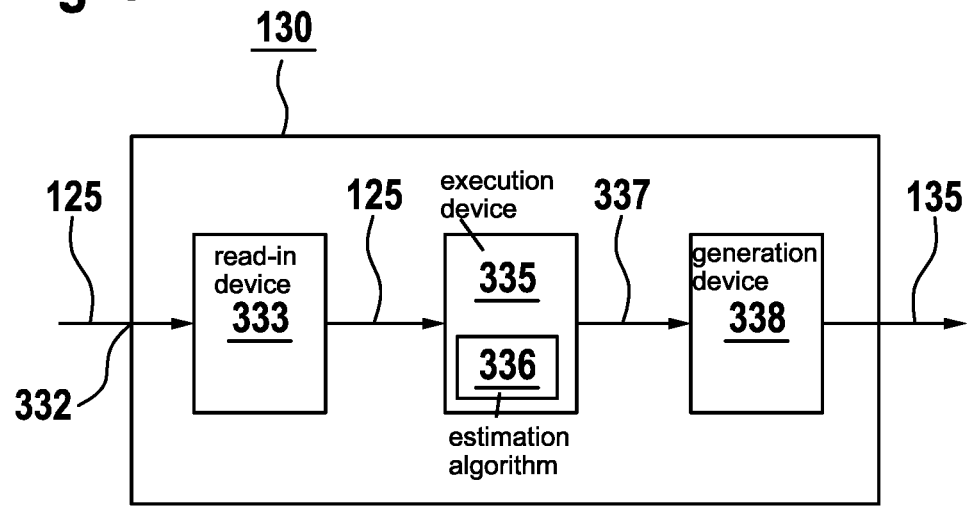
FIG. 3 shows a schematic illustration of one exemplary embodiment of a device according to the present invention for providing personal tracking data for controlling at least one function of a technical system.

FIG. 3 shows a schematic illustration of one exemplary embodiment of a device 130 for providing personal tracking data 135 for controlling at least one function of a technical system. Tracking data 135 represent a profile of a position of at least one person. Device 130 corresponds to or resembles the device from one of the figures described above. A read-in device 333, an execution device 335, and a generation device 338 of device 130 are shown in the illustration in FIG. 3. In addition, an input interface 332 of device 130 is shown.

Read-in device 333 is designed to read in sensor data 125 via an interface, in the present case input interface 332, to the preprocessing device. Sensor data 125 represent the point cloud that is generated by the preprocessing device. Read-in device 333 is also designed to pass on read-in sensor data 125 to execution device 335 or to make the read-in sensor data available to same.

Execution device 335 is designed to execute an estimation algorithm 336, using sensor data 125, in order to generate at least one corrected position profile track 337 of the position of the at least one person. Estimation algorithm 336 is designed to predict, for a present detection point in time, at least one position profile track to be corrected, using a predefined kinematic model, point targets from the sensor data 125 that are detected at the present detection point in time, and at least one preliminary position profile track. Estimation algorithm 336 is also designed to determine, from sensor data 125 and the at least one position profile track to be corrected, distance values between point targets that are detected at the present detection point in time. Estimation algorithm 336 is also designed to assign point targets that meet a distance criterion to the at least one position profile track to be corrected. In addition, estimation algorithm 336 is designed to apply a density-based cluster analysis algorithm to point targets that are assigned to the at least one position profile track to be corrected, in order to determine at least one cluster property. Estimation algorithm 336 is also designed to correct the at least one position profile track to be corrected, using the at least one cluster property, in order to generate the at least one corrected position profile track 337.

Generation device 338 is designed to take over or receive the at least one corrected position profile track 337 from execution device 335. Generation device 338 is also designed to generate tracking data 135, using the at least one corrected position profile track 337. Device 130 is designed to provide tracking data 135 to the technical system, in particular via an output interface of device 130.

According to one exemplary embodiment, execution device 335 is designed to repeatedly execute estimation algorithm 336. Estimation algorithm 336 is an iterative estimation algorithm, in particular a Kalman filter. In particular, for a repeated execution of estimation algorithm 336, the at least one corrected position profile track 337 from an immediately preceding execution of estimation algorithm 336 is used as the at least one preliminary position profile track. The distance criterion used within the scope of estimation algorithm 336 allows a maximum distance value of at least 1 meter, for example. According to one exemplary embodiment, execution device 335 is designed to assign point targets, belonging to a largest cluster of clusters that are generated with the aid of the density-based cluster algorithm, to the at least one position profile track to be corrected.

Figure 4:
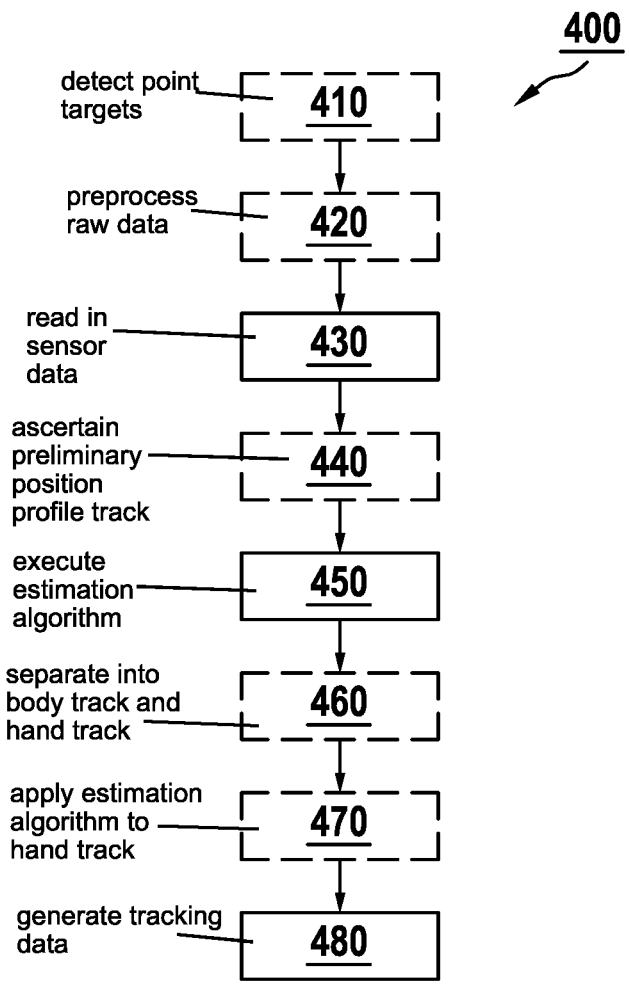
FIG. 4 shows a flowchart of one exemplary embodiment of a method according to the present invention for providing personal tracking data for controlling at least one function of a technical system.

FIG. 4 shows a flowchart of one exemplary embodiment of a method 400 for providing personal tracking data for controlling at least one function of a technical system. Method 400 for providing may be carried out in conjunction with or using the sensor system and/or the device from one of the figures described above, or a similar sensor system or a similar device. Method 400 for providing includes a step 430 of reading in, a step 450 of executing, and a step 480 of generating.

In step 430 of reading in, sensor data are read in from an interface to a preprocessing device for preprocessing raw data of two spaced-apart radar sensors with partially overlapping fields of view. The sensor data represent a point cloud that is generated by the preprocessing device and made up of point targets that are detected in the detection surroundings with the aid of the radar sensors.

An estimation algorithm is subsequently executed in step 450 of executing, using the sensor data, in order to generate at least one corrected position profile track of the position of the at least one person. The executed estimation algorithm is designed to predict, for a present detection point in time, at least one position profile track to be corrected, using a predefined kinematic model, point targets from the sensor data that are detected at the present detection point in time, and at least one preliminary position profile track. In addition, the estimation algorithm is designed to determine, from the sensor data and the at least one position profile track to be corrected, distance values between point targets that are detected at the present detection point in time. The estimation algorithm is also designed to assign point targets that meet a distance criterion to the at least one position profile track to be corrected. In addition, the estimation algorithm is designed to apply a density-based cluster analysis algorithm to point targets that are assigned to the at least one position profile track to be corrected, in order to determine at least one cluster property. The estimation algorithm is also designed to correct the at least one position profile track to be corrected, using the at least one cluster property, in order to generate the at least one corrected position profile track.

The tracking data are subsequently generated, using the at least one corrected position profile track, in step 480 of generating. The tracking data represent a profile of a position of at least one person.

According to one exemplary embodiment, method 400 for providing also includes a step 440 of ascertaining the at least one preliminary position profile track of the position of the at least one person, using point targets from the sensor data that are detected at at least two past detection points in time. Step 440 of ascertaining may be carried out between step 430 of reading in and step 450 of executing.

In particular, step 450 of executing is repeated at least once, the estimation algorithm being an iterative estimation algorithm, in particular a Kalman filter. Additionally or alternatively, during such a repeated carrying out of step 450 of executing, the at least one corrected position profile track from an immediately preceding carrying out of the step of executing is used as the at least one preliminary position profile track.

According to one exemplary embodiment, method 400 for providing also includes a step 460 of separating the at least one corrected position profile track into a body track and a hand track, using a cluster analysis algorithm. Starting from an original cluster that is assigned to the corrected position profile track, two new clusters are generated, the new cluster situated closer to the radar sensors being assigned to the hand track, and the new cluster situated farther from the radar sensors being assigned to the body track. In addition, method 400 for providing also includes a step 470 of applying the estimation algorithm to the hand track in order to generate a corrected hand track. The tracking data are generated in step 480 of generating, using the corrected hand track. In particular, in step 470 of applying, a velocity vector of point targets assigned to the hand track is estimated, using radial velocities and azimuth angles of the point targets that are detected with the aid of the radar sensors. Optionally, the velocity vector is also used as a parameter of the estimation algorithm when the point targets assigned to the hand track are situated in an overlapping area of the fields of view of the radar sensors.

For example, method 400 for providing also includes a step 410 of detecting point targets in the detection surroundings of the two spaced-apart radar sensors with partially overlapping fields of view. According to one exemplary embodiment, method 400 for providing also includes a step 420 of preprocessing raw data of the two spaced-apart radar sensors with partially overlapping fields of view, in order to generate the point cloud from point targets that are detected in the detection surroundings with the aid of the radar sensors.

With reference to the figures described above, possible procedures or sequences relating to device 130 and/or method 400 for providing are explained in somewhat greater detail below, initially with regard to the personal tracking or tracking of positions or persons, sometimes in paraphrased form.

The signal processing may be subdivided into two main portions. The first portion relates to the baseband processing or preprocessing of raw data 115; a point cloud containing hundreds or even thousands of targets or target objects is generated as a function of the following parameters: monitoring of the constant false alarm rate (CFAR), the objects in the setting, radar sensor-characteristics, etc. The second portion uses the point cloud, generates objects therefrom with the aid of cluster analysis, and tracks their movement over time.

In the baseband processing, values are obtained from analog-to-digital converter 221 of radar sensor 110, and common signal processing procedures such as for similar vehicle radar systems are applied. The most important steps are stated briefly below:

Two-dimensional FFT for computing the spectrum (range-Doppler map).

Constant false alarm rate for estimating the background noise or noise level.

The sections of the spectrum situated above the background noise are retained.

Digital beamforming (DBF) is applied only for these sections, and the azimuthal incidence angle and elevation are computed.

The attributes (range, radial velocity, azimuthal incidence angle, elevation incidence angle, magnitude) of computed target objects are saved in a point cloud.

Tracking of extended target objects is described in greater detail below. In the simple case of a single point target, an estimate of its range, radial velocity, and angle is present after each measuring pass or measuring frame is concluded. However, this estimate is distorted by noise and has uncertainty. The estimated value may be improved by collecting a series of measurements over time and combining them, using a kinematic model. The Kalman filter (KF) is a common procedure for achieving this. The Kalman filter is able to effectively deal with the uncertainty that results from noisy sensor data, and to a certain extent, to also deal with random external factors. The filter generates an estimate of the state of the system as an average of the predicted state of the system and the new measurement, using a weighted average value. In each time increment k, the system to be observed should satisfy the model given in equations (1) and (2):

$$x_k = F_k x_k + B_k u_k + w_k \quad \text{equation (1)}$$

$$z_k = H_k x_k + v_k \quad \text{equation (2)}$$

$F_k$ is known as the transition matrix or state transition matrix, $x_k$ is the state vector, $B_k$ describes the input model, $u_k$ is in [sic] the input vector, and $w_k$ is the process noise, assumed from a multidimensional normal distribution having an average value of zero, and having a covariance $Q_k$. For the measurement equation, observation matrix $H_k$ transfers the state of the filter to observation $z_k$, and $v_k$ represents the measurement noise, assumed from a multidimensional normal distribution having an average value of zero, and having a covariance $R_k$.

The processing of the Kalman filter is subdivided into two stages, namely, prediction and correction. For the former, a state estimation is computed, using the kinematic model and the previously computed noise covariance. The latter computes the residuals using the new measurement and the state estimation, and then computes the Kalman gain and corrects the state estimation.

The designing of the Kalman filter requires the definition of the state vector and the measurement vector, the corresponding noise covariance matrices Q and R, and the transition from the measurement space into the state space. For example, a linear Kalman filter is used herein. The state vector contains the position and velocity in two dimensions, whereas the measurement vector contains only the position (cf. also equations (3) and (4)).

$$x = [pos_x, pos_y, vel_x, vel_y] \quad \text{equation (3)}$$

$$z = [pos_x, pos_y] \quad \text{equation (4)}$$

Radar systems such as radar sensors 110 do not directly estimate a position in Cartesian coordinates, but this may be computed via the preprocessing step that is apparent from equation (5), using the range and the azimuth incidence angle.

$$z_k = [r_k \sin(\theta_k), r_k \cos(\theta_k)] \quad \text{equation (5)}$$

The polar coordinate system of the radar may be used with nonlinear Kalman filters such as the unscented Kalman filter (UKF) and the extended Kalman filter (EKF).

A large object is regarded as an extended target object and not as a point target. This is due to the fact that the object, on account of its size and the wavelength utilized by the radar, generates a large number of point targets. Persons are regarded as extended target objects, since they generate large numbers, even hundreds, of point targets for a detection by radar sensors 110.

In addition to two conventional approaches for personal tracking, referred to a "cluster first, track later" and "group tracking," an approach used according to exemplary embodiments is also presented below, in which characteristics from the existing method are combined, and which are to be referred to as "group tracking with cluster analysis." For all approaches, in the following discussion it is assumed by way of example that there are already several available tracks at point in time k, and the system would like to update or correct their state based on a new radar measurement. At the initial point in time no clusters are available, in this case it being possible to use a density-based cluster analysis or cluster formation for the initial estimation of the clusters.

In the "cluster first, track later" approach, for example the following steps are carried out:

(a) predicting the increment of the filter or predicting the increment for all tracks, using the point targets: use of the kinematic model and the measurements up to point in time k−1 in order to predict the position of the track to be tested (track under test (TuT)) at point in time k.

(b) applying a density-based cluster analysis algorithm (DBSCAN, for example) to find clusters having high concentrations of point targets. A common approach is to use two-dimensional Cartesian coordinates, although the radial velocity is sometimes used and a search is made for clusters in a three-dimensional space. In addition, there are enhanced versions of DBSCAN that make use of the fact that the radar target objects may be in only one coordinate network (range, incidence angle, radial velocity). Occasionally, use is also made of the polar coordinate system of a radar sensor; the same object will generate many point targets when it is close to the radar. When this step is completed, the large number of point targets are mapped into a significantly smaller number of clusters. The center of gravity of its cluster is typically computed using a weighted average value of the position of the targets belonging to the cluster; the magnitude of the target is used as weighting. Targets with strong return signals thus have greater influence on the computation of the center of gravity of the cluster.

(c) assigning or associating the centers of gravity of the clusters to/with the existing tracks. This is generally carried out by an assignment algorithm (Hungarian method, for example). If a cluster is not allocated, a new track is initiated.

(d) lastly, updating or correcting the increment or the tracks, using the new measurement; this involves the center of gravity of the assigned cluster.

An implicit difficulty with this approach is that when two objects are situated very close to one another, the cluster analysis algorithm regards them as one cluster and allocates them to one of the two tracks. Thus, the other track is not updated or corrected until the two objects are once again separated. If this is repeated over many time frames, the track management system will delete the track that is not updated. Although there is a proposed solution for the difficulty in the case of two combining tracks, the problem becomes more complex for more than two tracks that are coming close together, and therefore may possibly not be suitably solvable. This could easily happen when two persons are situated near a piece of furniture.

In the "group tracking" approach, for example the following steps are carried out:

(a) predicting the increment of the filter: use of the kinematic model and the measurements up to point in time k−1 in order to predict the position of the track to be tested (track under test (TuT)) at point in time k.

(b) for each existing track i and for all point targets j that have been obtained at point in time k, computing their distances (using the Euclidean algorithm or Mahalanobis algorithm), which represents the number of new changes that the new measurement adds to an existing track. The number of new changes that one is prepared to accept depends on the gate size. Point targets that do not meet the gating criteria are not regarded as possible candidates for the assignment to the TuT.

(c) after the gating and the computing of the distances, assigning the point targets to the tracks having the smallest distance.

(d) computing a center of gravity for each track to be tested, using the new point targets that have been assigned.

(e) lastly, updating or correcting the tracks, using the new measurement; this involves the center of gravity computed in the preceding step.

Compared to "cluster first, track later," with "group tracking" the main difference is that no density-based algorithm is used. The approach is thus more robust to the problem of track combination. The permissible gate is a very important parameter. If a high value is set during an arm gesture, for example, all point targets of the arm may be within the gate. However, noisy targets in addition to the track could also be assigned. If a low value is used, only the point targets of the body of a human are used in the track. The remaining targets (an arm, for example) could be assigned to neighboring tracks.

According to exemplary embodiments, in the "group tracking with cluster analysis" approach, for example the following steps are carried out, which are initially stated in a brief summary below. Using the point targets, an increment for all tracks is predicted, a distance between targets and tracks is subsequently computed, a target-to-track assignment is carried out, targets assigned to the track are subjected to a cluster analysis, and the increment is updated or corrected with a new measurement. The group tracking may be handled using multiple users that are close to one another. The first applied modification is to increase the size of the permissible gate. In other words, targets or point targets may be assigned to a track at a distance of at least one meter from this track. To compensate for possible effects of this modification so that targets of other users or random noise are/is not assigned to the track to be tested, a further modification is provided; instead of merely finding the center of gravity of assigned targets, a density-based cluster algorithm is applied to the assigned targets. If more than one cluster is generated, the targets belonging to the larger cluster are selected and assigned to the track to be tested. Targets that belong to other clusters may be used by other tracks. Two advantages may thus be observed: The cluster algorithm discards noisy targets that would meet the criteria of the CFAR, since they will not form a dense region. If targets from other users are initially assigned to the track to be tested, the density-based cluster algorithm will discard them, since they will form a smaller cluster.

For the three approaches described above, the achievable results are briefly stated below in comparative form.

In a first test series, a typical scenario is present in which two users come close to one another. This occurs, for example in three phases. For example, in the "cluster first, track later" approach, the tracks merge when the users come close to one another. In principle, this may be avoided in the other two approaches. In a first phase, two users approach one another. A different track is assigned to each user, in this case 0 and 1, for example. In a second phase, two users are very close to one another. In the case of the "cluster first, track later" approach, the tracks of the users have combined. In a third phase, the two users go back into their original position. In the case of the "cluster first, track later" approach, a new track has been generated, and the history of the old track is lost. According to exemplary embodiments, this may be avoided according to the "group tracking with cluster analysis" approach.

In a second test series, a gesture recognition experiment using multiple users is carried out, the two users being intentionally placed close to one another. For example, user 0 makes an up-down swipe gesture, whereas user 1 makes only left-right swipe gestures. In other words, two users sequentially make arm gestures, with user 1 moving the arm. The "group tracking" approach assigns the point targets to the incorrect user, based on the distance criterion. This may be regarded as a typical example of an incorrect assignment of point targets when users are close together. In the case of the "group tracking" approach, at the start time, point targets belonging to user 1 are assigned to user 0 since they are closer to the center of gravity of the track. However, the "group tracking with cluster analysis" approach uses DBSCAN, for example, and recognizes that the body of user 0 and the point targets form two separate clusters. The "group tracking with cluster analysis" approach correctly recognizes that the point targets originally assigned to user 0 do not form a dense cluster, and discards them. These point targets were assigned to the closest track in the vicinity, that of user 1. In addition, a typical example of noisy point targets that are assigned to the track to be tested is possible. In the case of the "group tracking with cluster algorithm" approach, the cluster method recognizes that the noisy targets do not form a dense cluster, and discards them. The "group tracking" approach assigns the noisy point targets close to user 1 to user 1. However, the "group tracking with cluster algorithm" approach uses DBSCAN, for example, and recognizes that these point targets do not generate a dense cluster, and regards them as noise. A similar situation results for user 2.

With reference to the figures described above, possible procedures or sequences relating to device 130 and/or method 400 for providing are also explained in somewhat greater detail below with regard to hand tracking or tracking of positions of a hand of a user, sometimes in paraphrased form.

When the personal tracking is completed, system 100 recognizes the position of persons and large objects in an indoor or outdoor environment. If one of the persons begins to move his/her arm from right to left, the tracking algorithm executed by device 130 and/or method 400 for providing assigns the point targets to the track of this user. This information collected over time is useful for the gesture recognition. However, since the tracking algorithm assigns the point targets of the arm to the track belonging to the user, it is possible that the hand movement may not be individually tracked. Therefore, according to exemplary embodiments the existing user track in the body and the hand are separated. The user may accordingly inform system 100 via any trigger mechanism (for example, voice, pushbutton, gesture, etc.). This may take place, for example, via a specific arm gesture called "rotate"; system 100 may detect and recognize such macro arm gestures. To separate the user track into two separate tracks for the body and the hand, for example the k-means algorithm is used, and is configured to find two different clusters using the original cluster. The cluster situated closer to radar sensors 110 is assigned to the hand, and the other cluster is assigned to the body.

When this procedure is completed, the above-mentioned tracking process may be utilized, and the position of the hand may be tracked for any number of time periods with the aid of device 130 and/or by carrying out method 400 for providing. Using two radar sensors 110 instead of a single radar [sic] offers the advantage of an enlarged field of view 213, which is sufficient to record a complete movement from left to right or vice versa. Even if the user is situated a few degrees to the left or to the right of the radar, this situation may be reliably controlled. In addition, a number of point targets assigned to the hand are thus advantageously sufficient for a reliable cluster formation or cluster analysis. The input for Kalman filters is the position of the cluster. Thus, during a maneuver of the hand, the Kalman filter requires a few updates or corrections until it draws near. By combining measurements of two radar nodes or radar sensors 110, the velocity vector may be estimated in a single "snapshot" and used for the tracking.

As shown in FIG. 2, system 100 has an enhanced hardware setup with a loosely coupled network or grid in which two identical radar nodes or radar sensors 110 are used. The measurements of the two radar sensors 110 are triggered with a few microseconds' difference, so that no interference results between them. The two radar sensors 110 are spaced apart at a distance of a few centimeters, for example 50 cm, along the x axis.

The signal processing chain is described below. After the application of the baseband processing with the aid of preprocessing device 120, the two sets of point targets are concatenated individually for each radar sensor 110. Therefore, the field of view is now significantly larger, since it combines field of view 113 of both radar sensors 110. If the hand of the user is situated [in] overlapping area 114 in field of view 113 of both radar sensors 110, this additionally results in two advantages. First, the number of point targets assigned to the hand track is greater. Second, it is possible to estimate the velocity vector of the hand in a single snapshot when the hand is regarded as a point target.

A velocity estimation using radar sensors 110 is described in greater detail below.

Figure 5:
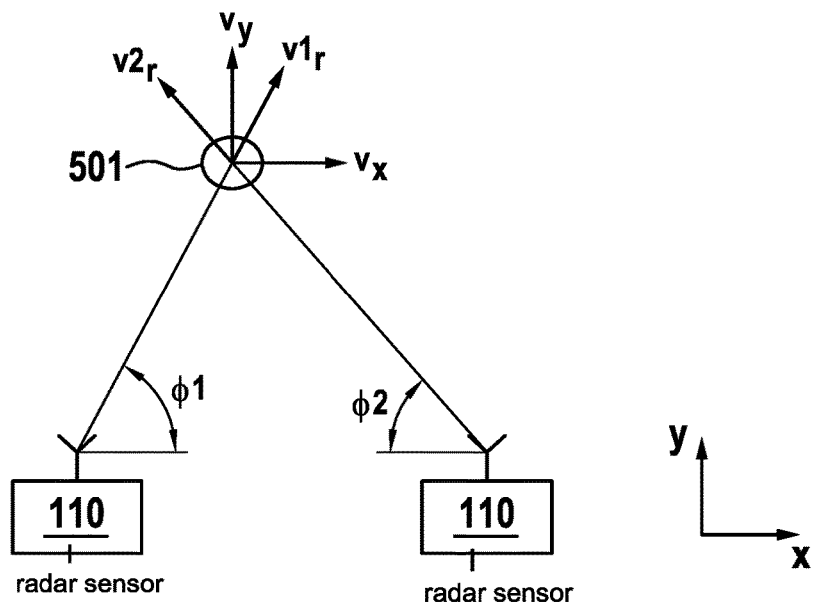
FIG. 5 shows a schematic illustration of a radar network that includes two nodes, and a moving target.

FIG. 5 shows a schematic illustration of a radar network that includes two nodes or radar sensors 110 and a moving target or point target 501. In other words, FIG. 5 shows an example of a geometry of a radar network that includes two nodes and a moving target or point target 501. The radar network including the two radar sensors 110 corresponds to or resembles the radar sensors of the sensor system from FIG. 1 or 2. The task is to estimate the velocity vector of a small target that is moving in a two-dimensional Cartesian space. Radar sensors 110 measure radial velocity $v1_r$ and $v2_r$ in each snapshot. In addition, they measure azimuth angles $\phi 1$ and $\phi 2$. Equation (6) may be derived using basic trigonometric transformations.

$$\begin{bmatrix} v1_r \\ v2_r \end{bmatrix} = \begin{bmatrix} \cos(\phi 1), \sin(\phi 1) \\ \cos(\phi 2), \sin(\phi 2) \end{bmatrix} \begin{bmatrix} v_x \\ v_y \end{bmatrix} \qquad \text{equation (6)}$$

This may be reformulated as in equation (7).

$$\vec{v_r} = A\vec{v} \qquad \text{equation (7)}$$

Using radar nodes having high resolution, the baseband processing or a procedure prior to processing generates many point targets 501, even for small objects. In this case, the above-mentioned equations are expanded, as in equation (8), by adding a line for each point target 501 detected by both radar sensors 110.

$$\begin{bmatrix} v1_r \\ v2_r \\ \vdots \\ vN_r \end{bmatrix} = \begin{bmatrix} \cos(\phi 1), \sin(\phi 1) \\ \cos(\phi 2), \sin(\phi 2) \\ \vdots \\ \cos(\phi N), \sin(\phi N) \end{bmatrix} \begin{bmatrix} v_x \\ v_y \end{bmatrix} \quad \text{equation (8)}$$

This may be reformulated as in equation (9).

$$\vec{v}_r = H\vec{v} \quad \text{equation (9)}$$

The above-mentioned system is overdetermined; the pseudo-inverse is computed and the velocity vector is estimated as in equation (10).

$$\vec{v} = (H^T H)^{-1} H^T \vec{v}_r \quad \text{equation (10)}$$

The above-mentioned system could be solved in equation (11) using numerical methods, which, however, is not considered here.

$$\vec{v} = \underset{v}{\operatorname{argmin}} \| \vec{v}_r - H\vec{v} \| \quad \text{equation (11)}$$

The estimated velocity may then be used in the measurement vector of the Kalman filter. However, the hand of the user in fact is not always in the field of view of both sensors, as the result of which the estimated velocity per time period cannot be completely relied on. To avoid this difficulty, the multiple model with velocity estimator (MMVelEst) has been developed, which utilizes two Kalman filters. The first filter is similar to the case of personal tracking, whereas the second filter includes the estimated velocity in Cartesian space in the measurement vector. If the "estimated velocity per time period" is not available, the first Kalman filter is used to update or correct the position. If the "estimated velocity per time period" is available, the second Kalman filter is used. Since the state vector is the same, the previous estimate of the state and the covariance matrix may be used in each case. This is also illustrated in FIG. 6.

Figure 6:
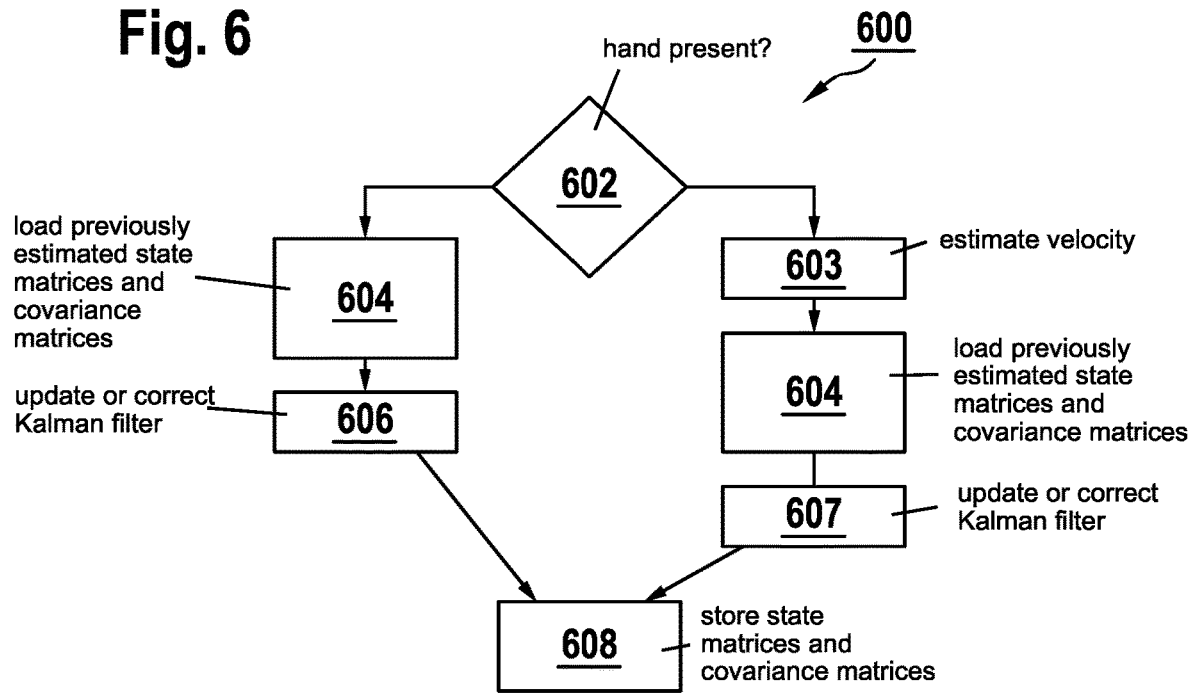
FIG. 6 shows a flowchart of a process for hand tracking in conjunction with the method from FIG. 4.

FIG. 6 shows a flowchart of a process 600 for hand tracking in conjunction with the method from FIG. 4. Process 600 relates to the above-mentioned multiple model with velocity estimator (MMVelEst), used for hand tracking with two radar nodes or two radar sensors.

Process 600 begins with a decision block 602, in which it is determined whether a hand is present in the field of view of two radar sensors. If this is not the case, process 600 goes from decision block 602 to a block 604 in which previously estimated state matrices and covariance matrices are loaded. Process 600 subsequently goes to a block 606 in which the Kalman filter is updated or corrected without using velocity. If it is determined in decision block 602 that a hand is present in the field of view of two radar sensors, process 600 goes from decision block 602 to a block 603, in which the velocity is estimated using two radar sensors. Process 600 subsequently goes from block 603 to a block 604, in which previously estimated state matrices and covariance matrices are loaded. From block 604, process 600 goes to a block 607 in which the Kalman filter is updated or corrected using velocity. From block 606 and also from block 607, process 600 goes to a block 608 in which state matrices and covariance matrices are stored.

With reference to the figures described above, results of the hand tracking are also briefly provided below. To evaluate the performance, a ground truth has been collected using an RGB-D camera, and the pose of the user has been extracted using Mediapipe. A comparison of MMVelEst and an individual Kalman filter shows that MMVelEst is able to follow a hand maneuver very well. However, the individual Kalman filter needs more time to follow the maneuver, and overestimates the end point. When the color of the clothing of the user is similar to the background, or when there are reflections from the sun, it may be difficult to collect accurate ground truth. In addition, ground truth may sometimes not be available from the camera-based system if the hand is moving. However, this takes place with great accuracy and robustness for static poses. Therefore, an ideal sensor system should include both a camera and millimeter wave-based sensors in order to achieve an optimal combination.

What is claimed is:

1. A method for providing personal tracking data for controlling at least one function of a technical system, the tracking data representing a profile of a position of at least one person, the method comprising the following steps:
reading in sensor data from an interface to a preprocessing device configured to preprocess raw data of two spaced-apart radar sensors having partially overlapping fields of view, the sensor data representing a point cloud that is generated by the preprocessing device and made up of point targets that are detected in detection surroundings using the radar sensors;
executing an estimation algorithm, using the sensor data, to generate at least one corrected position profile track of the position of the at least one person;
separating the at least one corrected position profile track into a body track and a hand track, using a cluster analysis algorithm;
applying the estimation algorithm to the hand track to generate a corrected hand track; and
generating the tracking data, using the at least one corrected position profile track and the corrected hand track; and
wherein in the separating step, two new clusters are generated, starting from an original cluster that is assigned to the corrected position profile track, a new cluster, of the two new clusters, which is situated closer to the radar sensors being assigned to the hand track, and a new cluster, of the two new clusters, which is situated farther from the radar sensors being assigned to the body track.

2. The method as recited in claim 1, wherein in the applying step, a velocity vector of point targets assigned to the hand track is estimated, using radial velocities and azimuth angles of the point targets that are detected using the radar sensors.

3. The method as recited in claim 2, wherein the velocity vector is used as a parameter of the estimation algorithm when the point targets assigned to the hand track are situated in an overlapping area of the fields of view of the radar sensors.

4. The method as recited in claim 1, further comprising detecting the point targets in the detection surroundings of the two spaced-apart radar sensors with the partially overlapping fields of view.

5. The method as recited in claim 1, further comprising preprocessing the raw data of the two spaced-apart radar sensors with the partially overlapping fields of view to generate the point cloud from the point targets that are detected in the detection surroundings using the radar sensors.

6. A device configured to provide personal tracking data for controlling at least one function of a technical system, the tracking data representing a profile of a position of at least one person, the device configured to:
   read in sensor data from an interface to a preprocessing device configured to preprocess raw data of two spaced-apart radar sensors having partially overlapping fields of view, the sensor data representing a point cloud that is generated by the preprocessing device and made up of point targets that are detected in detection surroundings using the radar sensors;
   execute an estimation algorithm, using the sensor data, to generate at least one corrected position profile track of the position of the at least one person;
   separate the at least one corrected position profile track into a body track and a hand track, using a cluster analysis algorithm;
   apply the estimation algorithm to the hand track to generate a corrected hand track; and
   generate the tracking data, using the at least one corrected position profile track and the corrected hand track; and
   wherein the device is further configured to, in the separate step, generate two new clusters, starting from an original cluster that is assigned to the corrected position profile track, a new cluster, of the two new clusters, which is situated closer to the radar sensors being assigned to the hand track, and a new cluster, of the two new clusters, which is situated farther from the radar sensors being assigned to the body track.

7. A sensor system, comprising:
   a device configured to provide personal tracking data for controlling at least one function of a technical system, the tracking data representing a profile of a position of at least one person, the device configured to:
      read in sensor data from an interface to a preprocessing device configured to preprocess raw data of two spaced-apart radar sensors having partially overlapping fields of view, the sensor data representing a point cloud that is generated by the preprocessing device and made up of point targets that are detected in detection surroundings using the radar sensors,
      execute an estimation algorithm, using the sensor data, to generate at least one corrected position profile track of the position of the at least one person,
      separate the at least one corrected position profile track into a body track and a hand track, using a cluster analysis algorithm,
      apply the estimation algorithm to the hand track to generate a corrected hand track; and
      generate the tracking data, using the at least one corrected position profile track and the corrected hand track;
   the two spaced-apart radar sensors with the partially overlapping fields of view; and
   the preprocessing device configured to preprocess the raw data of the radar sensors, the preprocessing device being connected to the radar sensors and to the device in a data-transmissible manner; and
   wherein the device is further configured to, in the separate step, generate two new clusters, starting from an original cluster that is assigned to the corrected position profile track, a new cluster, of the two new clusters, which is situated closer to the radar sensors being assigned to the hand track, and a new cluster, of the two new clusters, which is situated farther from the radar sensors being assigned to the body track.

8. A non-transitory machine-readable memory medium on which is stored a computer program for providing personal tracking data for controlling at least one function of a technical system, the tracking data representing a profile of a position of at least one person, the computer program, when executed by a computer, causing the computer to perform the following steps:
   reading in sensor data from an interface to a preprocessing device configured to preprocess raw data of two spaced-apart radar sensors having partially overlapping fields of view, the sensor data representing a point cloud that is generated by the preprocessing device and made up of point targets that are detected in detection surroundings using the radar sensors;
   executing an estimation algorithm, using the sensor data, to generate at least one corrected position profile track of the position of the at least one person;
   separating the at least one corrected position profile track into a body track and a hand track, using a cluster analysis algorithm;
   applying the estimation algorithm to the hand track to generate a corrected hand track; and
   generating the tracking data, using the at least one corrected position profile track and the corrected hand track; and
   wherein in the separating step, two new clusters are generated, starting from an original cluster that is assigned to the corrected position profile track, a new cluster, of the two new clusters, which is situated closer to the radar sensors being assigned to the hand track, and a new cluster, of the two new clusters, which is situated farther from the radar sensors being assigned to the body track.

9. A method for providing personal tracking data for controlling at least one function of a technical system, the tracking data representing a profile of a position of at least one person, the method comprising the following steps:
   reading in sensor data from an interface to a preprocessing device configured to preprocess raw data of two spaced-apart radar sensors having partially overlapping fields of view, the sensor data representing a point cloud that is generated by the preprocessing device and made up of point targets that are detected in detection surroundings using the radar sensors;
   executing an estimation algorithm, using the sensor data, to generate at least one corrected position profile track of the position of the at least one person;
   separating the at least one corrected position profile track into a body track and a hand track, using a cluster analysis algorithm;
   applying the estimation algorithm to the hand track to generate a corrected hand track; and
   generating the tracking data, using the at least one corrected position profile track and the corrected hand track; and
   wherein the estimation algorithm that is executed in the executing step is configured to i) predict, for a present detection point in time, at least one position profile track to be corrected, using a predefined kinematic model, point targets from the sensor data that are detected at the present detection point in time, and at least one preliminary position profile track, ii) determine, from the sensor data and the at least one position profile track to be corrected, distance values between point targets that are detected at the present detection point in time, iii) assign point targets that meet a distance criterion to the at least one position profile track to be corrected, iv) apply a density-based cluster analysis algorithm to point targets that are assigned to the at least one position profile track to be corrected, to determine at least one cluster property, and v) correct the at least one position profile track to be corrected, using the at least one cluster property, to generate the at least one corrected position profile track.

10. The method as recited in claim 9, further comprising: ascertaining the at least one preliminary position profile track of the position of the at least one person, using point targets from the sensor data that are detected at at least two past detection points in time.

11. The method as recited in claim 9, wherein: the executing step is repeated at least once, the estimation algorithm being an iterative estimation algorithm including a Kalman filter, and/or for a repeated carrying out of the executing step, the at least one corrected position profile track from an immediately preceding carrying out of the executing step is used as the at least one preliminary position profile track.

12. The method as recited in claim 9, wherein the distance criterion used in the executing step allows a maximum distance value of at least 1 meter.

13. The method as recited in claim 9, wherein in the executing step, point targets that belong to a largest cluster of clusters that are generated using the density-based cluster algorithm are assigned to the at least one position profile track to be corrected.

* * * * *